United States Patent
Winkler et al.

(10) Patent No.: US 7,484,612 B2
(45) Date of Patent: Feb. 3, 2009

(54) OVERLOAD PROTECTION DEVICE COMPRISING AN ELECTRIC SWITCHING UNIT

(75) Inventors: Ralf Winkler, Nordheim (DE); Bruno Felhauer, Brackenheim (DE); Friedrich Kurz, Nordheim (DE)

(73) Assignee: Schunk GmbH & Co. KG Fabrik fuer Spann- und Greifwerkzeuge (DE)

( * ) Notice: Subject to any disclaimer, the term of this patent is extended or adjusted under 35 U.S.C. 154(b) by 299 days.

(21) Appl. No.: 11/578,289

(22) PCT Filed: Apr. 18, 2005

(86) PCT No.: PCT/EP2005/004085

§ 371 (c)(1),
(2), (4) Date: Oct. 13, 2006

(87) PCT Pub. No.: WO2005/099974

PCT Pub. Date: Oct. 27, 2005

(65) Prior Publication Data

US 2007/0242397 A1    Oct. 18, 2007

(30) Foreign Application Priority Data

Apr. 19, 2004    (DE) .................. 10 2004 021 000

(51) Int. Cl.
*F16D 13/54*    (2006.01)
(52) U.S. Cl. .............. 192/150; 361/1; 901/1; 901/11; 901/34; 901/50; 307/326
(58) Field of Classification Search .......... 361/1; 901/11, 34, 50; 192/150; 307/326
See application file for complete search history.

(56) References Cited

U.S. PATENT DOCUMENTS

| 4,540,331 | A | * | 9/1985 | Stanner et al. ............ 414/730 |
| 4,557,661 | A |   | 12/1985 | Fischer |
| 4,714,865 | A | * | 12/1987 | Chin et al. .................. 318/563 |
| 4,717,003 | A |   | 1/1988 | McCormick |

(Continued)

FOREIGN PATENT DOCUMENTS

DE    25 56 595    7/1976

(Continued)

*Primary Examiner*—Rita Leykin
(74) *Attorney, Agent, or Firm*—Paul Vincent

(57) ABSTRACT

The invention relates to an overload protection device (1) comprising a housing (2) which is designed to be fixed to a manipulation device. The overload protection device comprises a tool holder (3) for fixing a tool that is attached to the housing in a displaceable manner, a pre-tensioning unit (4) for generating a pre-tensioning force between the housing and the tool holder, the pre-tensioning unit being configured as a piston assembly with a pressure piston which can be loaded by a medium and with a switching unit (5) that operates by means of relative displacement between the housing and the tool holder. The switching unit has a least one electrically conducting switching surface (6) and at least one electrically conducting contact element (7) that can be brought into electrical contact with the switching surface, the switching surface (6) and the contact element (7) being provided on an opposing surface section (8) of the tool holder and the housing. The contact element (7) is configured as a sealing element, which seals off at least sections of the pressure piston from the switching surface (6).

14 Claims, 2 Drawing Sheets

U.S. PATENT DOCUMENTS

| | | | |
|---|---|---|---|
| 4,954,005 A | | 9/1990 | Knasel |
| 5,086,901 A | * | 2/1992 | Petronis et al. ............. 192/150 |
| 5,626,216 A | * | 5/1997 | Sperling et al. ............ 192/150 |
| 5,839,557 A | | 11/1998 | McCormick |
| 5,857,815 A | * | 1/1999 | Bailey et al. ................ 409/201 |
| 6,069,415 A | | 5/2000 | Little |
| 6,214,057 B1 | * | 4/2001 | Spencer et al. ................ 403/13 |
| 6,346,751 B1 | * | 2/2002 | Delfino et al. .............. 307/326 |
| 6,491,612 B1 | * | 12/2002 | Kurup et al. ................. 483/16 |
| 6,690,208 B2 | * | 2/2004 | Gloden et al. ............... 307/326 |
| 2007/0158891 A1 | * | 7/2007 | Stark ......................... 269/309 |

FOREIGN PATENT DOCUMENTS

| | | |
|---|---|---|
| DE | 28 54 459 | 8/1980 |
| DE | 252 512 | 12/1987 |
| DE | 36 05 505 | 8/1988 |
| DE | 40 03 420 | 9/1990 |

* cited by examiner

OVERLOAD PROTECTION DEVICE COMPRISING AN ELECTRIC SWITCHING UNIT

This application is the national stage of PCT/EP2005/004085 filed on Apr. 18, 2005 and also claims Paris Convention priority of DE 10 2004 021 000.4 filed on Apr. 19, 2004.

BACKGROUND OF INVENTION

The invention concerns an overload protection device comprising a housing which is designed to be mounted to a manipulation device, a tool holder for mounting a tool, which is movably disposed on the housing, a pretensioning unit designed for a pretensioning force between the housing and the tool holder, and a switching unit that switches in response to relative motion between the housing and the tool holder.

Overload protection devices are known in the art and are used in manipulation devices that are operated by external forces, such as e.g. axially or path-controlled industrial robots, in order to prevent damage caused by collisions through movement between the manipulation device and objects in the vicinity of the manipulation device. Towards this end, an overload protection device has a housing that can be mounted to the manipulation device, e.g. a receiving flange of a robot arm. A tool holder, e.g. in the form of a tool flange, is disposed on the housing and is designed to receive manipulation tools, e.g. gripping means, processing means and measuring means. The tool holder is thereby movably connected to the housing to permit relative motion between the housing and the tool holder, in particular, deflection of the tool holder. Linear and/or rotational relative motion may thereby be performed in dependence on an application range of the manipulation devices provided on the tool holder. The relative motion may be limited by the construction of the housing and the tool holder mounted thereto. In order to prevent undesired relative motion, a pre-tensioning means provides a pretensioning force between the housing and the tool holder such that relative motion only occurs when the pre-tensioning force has been overcome. In the event of a collision between the manipulation tool and an object, the collision force is thereby limited by the magnitude of the pre-tensioning force. Since one cannot exclude that an available motion tolerance of the relative motion between the housing and the tool holder is sufficient to completely accept the motion exercised by the manipulation device, a switching unit is provided between the housing and the tool holder which generates a switching signal in case of minimum deflection of the tool holder relative the housing, that can be passed on to a control means of the manipulation device in order to stop the motion of the manipulation device and optionally move it in the opposite direction.

One conventional embodiment of an overload protection device is the model OPS 80 of the Assignee, which is shown in current catalogues. The OPS 80 has a cylindrical housing with mounting bores for mounting to an industrial robot. The cylindrical housing also has a cylindrical tool holder that it is mounted such that it can be linearly displaced and rotated. The tool holder may be loaded with a pretensioning force via a pressure piston or a spring means, thereby permitting transmission of a constructively limited torque or a corresponding force that is required for using a tool mounted to the tool holder. Proximity switches are disposed at a front end of the housing facing the tool holder, which are separated from each other by 120° and which can trigger a switching signal in the event of a collision and the resulting approach of the tool holder towards the housing, thereby stopping the motion of the manipulation device. U.S. Pat. No. 4,717,003 discloses an overload protection device that has spring elements for generating a pre-tensioning force. The separation between the housing and a tool plate is thereby determined by sensors. When a predetermined separation is exceeded, a signal is issued.

DD 252 512 A3 discloses an adapter with collision protection having a basic housing. The basic housing has a pressurized volume that is sealed by a membrane. When a flange is lifted from the locking means, a sensor emits a signal.

It is the underlying purpose of the invention to provide an overload protection device of the above-mentioned type, which facilitates the construction thereof and improves its flexibility.

SUMMARY OF THE INVENTION

This object is achieved by a switching unit comprising the features of the independent claim.

These features provide direct electric coupling between the mutually facing surface sections of the housing and the tool holder, which considerably simplifies the switching unit compared to prior art. The switching surface may thereby be alternatively associated with the housing or the tool holder: the contact element is thereby provided on the respectively opposite surface section. As soon as the surface sections move away from each other in the event of a collision due to relative motion between the housing and the tool holder, the electric contact between the switching surface and the contact element is interrupted, thereby producing a switching signal.

In accordance with the invention, the pre-tensioning means is designed as a piston arrangement which can be loaded by a medium. The housing thereby forms a cylinder in which the pretensioning means, being designed as a piston arrangement, is movably disposed, and into which, in particular, liquid and/or gaseous medium can be introduced. The medium may exert a pressure force in the cylinder, thereby pre-tensioning the piston arrangement, wherein a piston is connected, in particular directly, to the tool holder, such that the pressure force of the medium may realize a variable pre-tensioning force for the tool holder.

The tool holder may thereby be loaded with the pre-tensioning force via a pressure piston, wherein the contact element is designed as a sealing element sealing the pressure piston, thereby effecting adjustment of the pre-tensioning force throughout an application range of the overload protection device. When e.g. a particularly sensitive tool is mounted to the tool holder, a slight pressure load on the pressure piston may provide a slight pre-tensioning force to ensure that the overload protection device is already triggered at small collision forces. By designing the contact element as a sealing element sealing the pressure piston, no additional seal is required. This facilitates the construction of the overload protection device. In a preferred embodiment, the sealing effect of the contact element for the pressure piston is designed such that, when the tool holder is deflected, the sealing effect of the pressure piston is removed. This provides particularly fast response for the overload protection device.

In one preferred embodiment of the invention, the contact element is produced from an elastic conducting material. The elastic conducting material ensures reliable electric contact with the switching surface, since the conducting material can compensate for mechanical tolerances of the surface sections. In particular, spring-elastic materials such as copper beryllium, nickel-titanium alloys or spring steels are particularly suited as elastic conducting materials. In one particularly preferred embodiment of the invention, the contact element is formed from a conducting elastomeric material which has, in particular, high long-term stability under difficult ambient conditions such as high temperatures and/or strong vibrations. In particular, materials filled or coated with metal, graphite or carbon black, such as silicone, perbunane or viton may be used as conducting elastomeric materials.

In one embodiment of the invention, the contact element is flatly supported on the switching surface in contact therewith and is elastically deformed by the pretensioning force. The elastic deformation and flat support of the contact element ensure reliable electric contact with the switching surface. In dependence on the geometrical design of the contact element and the material selection, the deformation path for the contact element may be predetermined in dependence on the pretensioning force. This produces different switching properties of the switching unit, which have a considerable influence on the relative motion between the housing and the tool holder required for triggering a switching signal. While a highly-elastic, highly deformable contact element has a large deformation path and therefore requires larger relative motion between the housing and the tool holder, the contact element may be stiffer, having a shorter deformation path to obtain short switching paths and thereby a spontaneous switching behavior.

In a preferred embodiment of the invention, the surface sections having the switching unit are provided in a switching area formed by the housing and/or the tool holder to protect them from environmental influences. This prevents moisture or dirt particles from entering, which could have a negative influence on the switching behavior of the switching unit, and also reduces or prevents external disturbing influences, in particular, electromagnetic waves. This ensures operation of the switching unit even under unfavorable ambient conditions and on a long-term basis.

In a further embodiment of the invention, the switching surface is designed as a printed board with several conducting surfaces. The printed board design permits production of the switching surface independently of the housing, and subsequent mounting thereof in the housing, thereby permitting individual adjustment to the requirements of the switching unit. In particular, fiber-reinforced artificial resin laminates with metal coating, e.g. copper-laminated plates are used as material for the switching surface. A plurality of switching surfaces may be disposed on the switching surface in such a manner that different switching functions can be performed in dependence on occurring relative motion between the housing and the tool holder. In addition to detection of a collision, this also permits e.g. detection of the collision direction, when the conducting surfaces are suitably arranged, such that the manipulation device can react in a defined manner.

In a preferred embodiment of the invention, the surface sections are substantially orthogonal to a trigger axis which is determined by an effective connection between the housing and the tool holder. This results in a particularly advantageous switching behavior of the switching unit, since reliable triggering of the switching unit is ensured both for collisions caused by motion of the overload protection device in the direction of the trigger axis, producing a linear motion of the tool holder relative to the housing, and for motion orthogonal to the trigger axis, producing a tilting motion of the tool holder relative to the housing.

In a further development of the invention, each conducting surface has the shape of a circular ring segment relative to the trigger axis. The collision is thereby spatially resolved which, in a particularly advantageous fashion, permits a defined reaction of the manipulation device. In the event of a collision in the direction of the trigger axis, substantially all conducting surfaces simultaneously lose electric contact with the contact element, resulting in a specific switching signal. In the event of collisions orthogonal to the trigger axis, the tool holder is tilted relative to the housing, such that only part of the conducting surfaces, in particular one conducting surface, loses contact with the contact element, which also results in a specific switching signal. In one particularly preferred embodiment, the circular ring segment-shaped conducting surfaces have a segment angle of 120°, which realizes an advantageous compromise between a reliable electric contact and a position resolution which is sufficient for most applications.

In a further embodiment of the invention, the contact element is a ring element. This provides a particularly simple design of the contact element, which also simultaneously supports the switching surface in a homogeneous and uniform fashion. The ring element may be circular, oval, or polygonal, thereby producing different switching properties through operative connection with the switching surface. In one particularly preferred embodiment of the invention, the contact element is circular and disposed coaxially to the trigger axis.

In a further embodiment of the invention, the contact element is disposed in a front end groove of the tool holder, which extends, at least in sections, about the trigger axis. This ensures secure retention of the contact element even in case of a tilting motion between the tool holder and the housing, and the groove prevents excessive deformation of the contact element.

In a preferred embodiment of the invention, the contact element provides electrical contact between the conducting surfaces of the printed board and supports current flow in a neutral position of the tool holder to detect disturbances. This realizes simple monitoring of the functionality of the switching unit. The switching unit is provided with an electric voltage, wherein the conducting surfaces are contacted by the contact element such that a current flows through some or all conducting surfaces. As long as the tool holder is in the neutral position, i.e. no external forces act on the tool holder or the housing which could produce a relative motion via a deformation path of the contact element, a neutral current flows which can be detected by a downstream evaluation means. This neutral current is a necessary, but not sufficient condition for proper function of the switching unit. When the current flow of a switching unit having this design and provided with a voltage is interrupted, malfunction can be assumed. In a preferred embodiment of the invention, a DC or AC resistance of the switching unit is used as a quality criterion for the state of the contact element and the conducting surfaces.

A further design of the invention comprises means for monitoring the neutral current flow and for detecting disturbances. The monitoring means permit precise and individually adjusted monitoring of the switching unit. The monitoring means supply a neutral voltage to the switching unit, which may be provided in the form of a constant or pulsed DC or AC voltage, and test the current flow through the switching unit caused by the neutral voltage. When the current flow differs from predeterminable nominal values, in particular, in view of criteria such as current strength or phase shift, the monitoring means produce a disturbance signal which can be transferred to an evaluation unit. The monitoring means may easily realize modular exchangeability of different switching units, since a standardized interface with the evaluation unit can be provided, irrespective of the design of the switching unit. In a preferred embodiment of the invention, the monitoring means provided for monitoring the neutral current flow and detecting disturbances including the required electronic components are, in particular, integrated in the switching unit, such that only one current supply and/or at least one signal line are required to completely monitor the function and/or state of the switching unit.

In a further embodiment of the invention, a switching path of the switching unit of s<2 mm is provided in an axial direction of the tool holder relative to the housing and/or a switching angle of α<10° is provided for tilting motions of the tool holder relative to the housing. This ensures particularly prompt reaction of the switching unit, such that rapid switch off or immediate motion reversal of the manipulation device is ensured to prevent damage in the event of a collision with surrounding objects. The switching path of the switching unit is thereby substantially determined by the deformation path of the contact element. In view of the switching angle, the geometrical design of the conducting surfaces is also of importance, since the contact element is lifted more quickly when the tool holder is tilted relative to the housing when the conducting surfaces are small and limited to a small angular region. In a particularly preferred embodiment of the invention, the contact element and/or the switching surface are elastically suspended to enlarge the switching path or the switching angle. This is of particular interest, when collisions with soft objects may predominantly occur which do not initially represent any danger of damage.

In a particularly preferred embodiment of the invention, the switching path depends on the pretensioning force, permitting both proportional and inversely proportional dependencies between the pretensioning force and the switching path. This dependence of the switching path on the pretensioning force may be realized, in particular, by the flexible suspension of the switching surface and/or the contact element, wherein an increase in the pretensioning force would shift the tool holder relative to the housing, thereby increasing the switching path.

Further advantages and features of the invention can be extracted from the following description of a preferred embodiment which is shown in the figures.

DESCRIPTION OF THE PREFERRED EMBODIMENT

Figure 1:
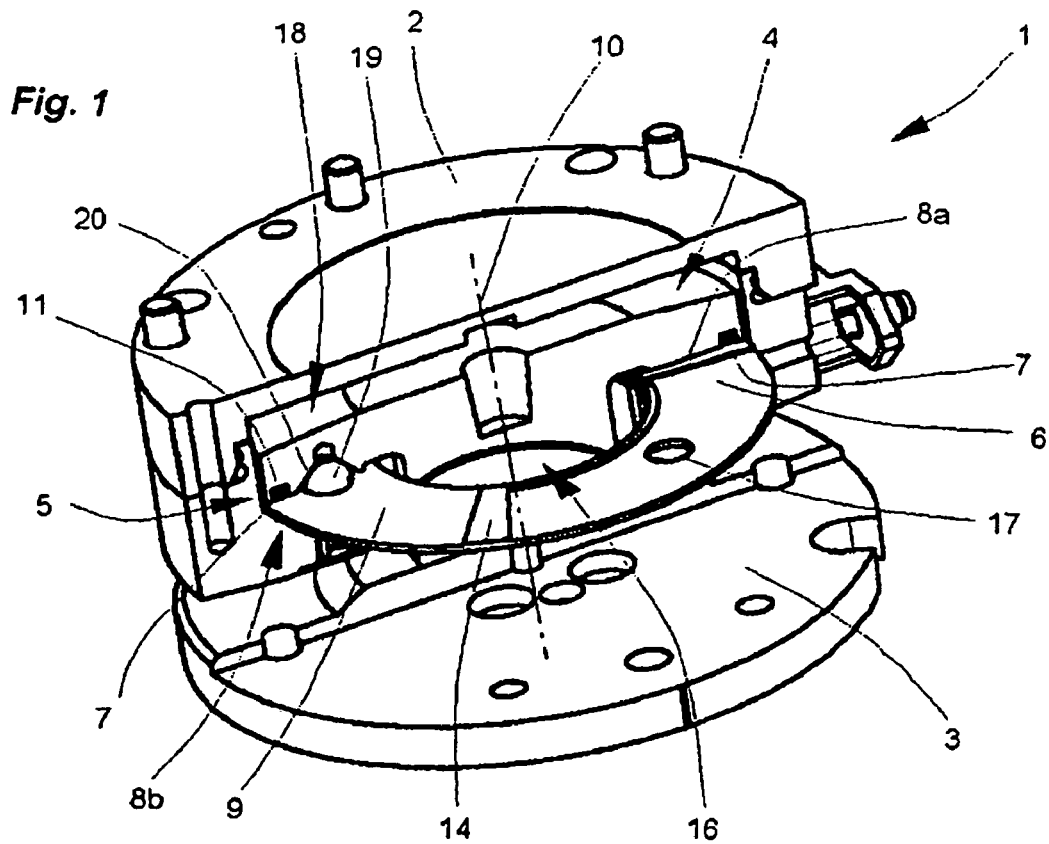
FIG. 1 shows a perspective view of an overload protection device in a neutral position.

An overload protection device 1 (shown in FIGS. 1 and 3) has a housing 2 which is provided for mounting to a manipulation device (not shown), in particular of an industrial robot, and a tool holder 3 movably mounted to the housing 2 for mounting a tool (not shown), in particular, a gripping tool or a processing tool. A pretensioning means 4 is provided between the housing 2 and the tool holder 3, which is designed to provide a pretensioning force between the housing 2 and the tool holder 3. In order to generate an electric switching signal, which can be used in particular to influence the manipulation device, a switching unit 5 is provided that operates in response to relative motion between the housing 2 and the tool holder 3. The switching unit 5 has at least one electrically conducting switching surface 6 and at least one conducting contact element 7 which can be electrically contacted with the switching surface 6. The switching surface 6 and the contact element 7 are formed on mutually facing surface sections 8a of the tool holder 3 and 8b of the housing 2.

Figure 2:
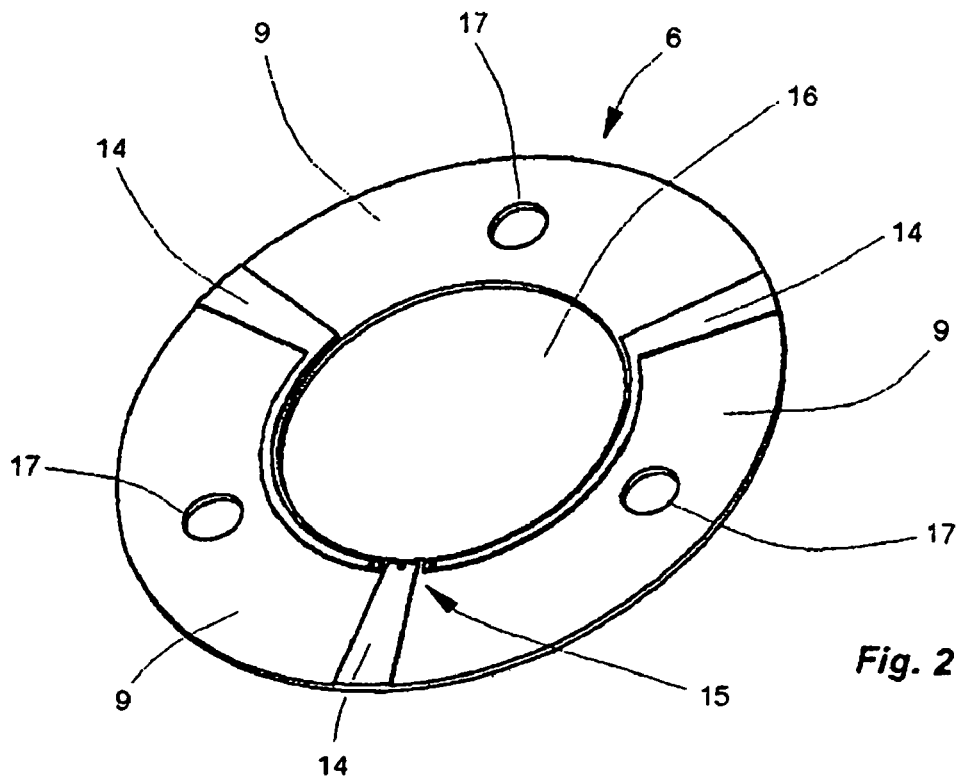
FIG. 2 shows a perspective view of a switching surface for the overload protection device of FIG. 1.
Figure 3:
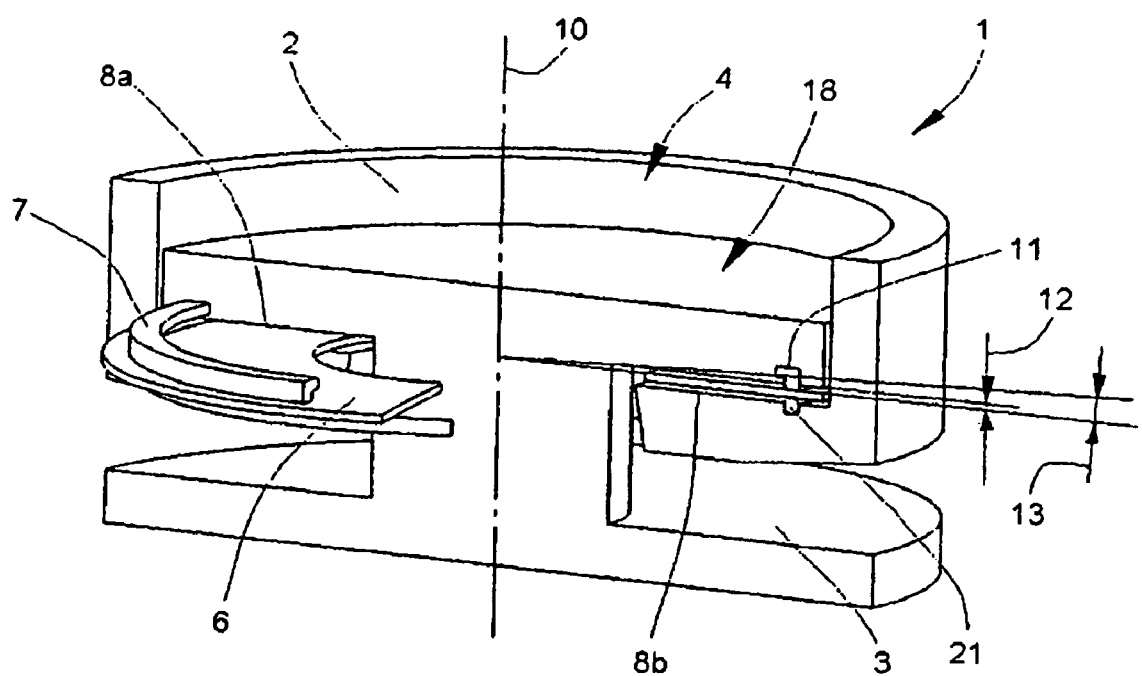
FIG. 3 shows a schematic view of the overload protection device of FIG. 1.

The contact element 7 is produced from an elastic conducting material, in particular, an elastomeric material which is filled and/or coated with conducting particles and is therefore conducting and is pressed onto the switching surface 6 in the contact state shown in FIGS. 1 and 3 by a pretensioning force provided by the pretensioning means 4, and is thereby elastically deformed. The contact element 7 is thereby flatly supported on the switching surface 6 and ensures stable electric contact between the contact element 7 and the conducting surfaces 9 (shown in more detail in FIGS. 1 and 2) in a contact state corresponding to a neutral state of the overload protection device. The contact element 7 is at least partially introduced into a circumferential front end groove 11 of the tool holder 3 and is thereby held in a predefined position and protected from being overloaded by excessive deformation.

The housing 2 and the tool holder 3 define a substantially closed switching area 18 to protect the surface sections 8a, 8b of the switching unit 5 and the contact element 7 from ambient influences. The switching area 18 of the housing 2 and the substantially piston-like section of the tool holder 3, which is adjusted thereto, permit a linear relative motion in the direction of a trigger axis 10, wherein the trigger axis 10 corresponds to a central longitudinal axis of the substantially cylindrical bore in the housing 2 or the substantially cylindrical contour of the piston-like section of the tool holder 3, received in the housing 2. The switching area 18 is designed as a cylindrical pressure chamber in which a pressure force can be exerted on the piston-like section of the tool holder 3 which acts as pretensioning force for the overload protection device 1 by exerting a pressure load produced by, in particular, a gaseous or liquid medium.

A suitable embodiment of the housing 2 and the tool holder 3 also permits a pivoting relative motion between the housing 2 and the tool holder 3, which may, in particular, be superimposed upon the linear relative motion. This pivoting motion is performed substantially about a pivot axis which is disposed in a plane which is orthogonal to the trigger axis 10.

The overload protection device 1 is installed on a manipulation device (not shown) between an arm of the manipulation device, which is operated, in particular, by an external force, and a tool to be mounted to the manipulation device, in particular, a gripping or processing device and is connected to a pressure medium supply, in particular, a compressed air or hydraulic medium supply and an electric control cable. Mounting of the overload protection device 1 to the manipulation device and mounting of the tool to the overload protection device may be realized by screw connections, wherein locating pins are provided on the overload protection device 1 for unambiguous positioning relative to the manipulation device. The switching area 18, designed as a pressure chamber, is loaded with a medium pressure via the pressure medium supply, which produces a pretensioning force between the housing and the piston-like section of the tool holder. The pretensioning force may thereby be varied depending on the operating state of the overload protection device 1 through varying the medium pressure. The pretensioning force presses the contact element 7, which is housed at the end face in the groove 11 of the piston-like section, onto the switching surface 6, thereby elastically deforming it, thereby producing an electric contact between the contact element 7 and the conducting surfaces 9 of the switching surface 6, the contact element 7 acting as a sealing element between the piston-like section and the switching surface 6. The switching surface 6 is positioned via a centering pin 19 (shown in detail in FIG. 1) relative to a centering cone 20 which is provided in the tool holder 3. The O-ring 21 provided in the housing 2 also seals with respect to the surroundings, and is operatively connected to the lower side of the switching surface 6. In the neutral position of the tool holder 3 relative to the housing 2, an electric current may flow into the conducting surfaces 9 via the contact element 7, wherein the presence of current flow in all conducting surfaces 9 can be assessed as an indicator for proper function of the switching unit 5. Towards this end, an evaluation unit (not shown) is connected to the switching unit 5, which loads the switching unit 5 with a voltage, thereby detecting the generated neutral current flow.

When the manipulation device is moved, acceleration forces act on the tool mounted to the tool holder 3, which should not generally trigger the overload protection device 1. For this reason, pretensioning force defines a minimum force acting on the tool holder 3 required to produce a relative motion between the tool holder 3 and the housing 2. Such a relative motion may occur e.g. in case of collision of the tool mounted to the tool holder 3 with an object in the surroundings of the manipulation device. In dependence on the collision direction, a force thereby acts in the direction of the trigger axis 10 or also with a component orthogonal to the trigger axis 10. This produces either a linear switching motion (represented by the switching path 12 schematically and exemplarily shown in FIG. 3), or an optionally superposed pivoting motion of the tool holder 3 (schematically and exemplarily shown as switching angle 13 in FIG. 3) relative to the housing 2. Due to the relative motion between the housing 2 and the tool holder 3, the opposite, mutually facing surface sections 8a, 8b shown in FIGS. 1 and 3 move away from each other such that the contact element 7 may be partially or completely lifted from the switching surface 6 to interrupt the current flow between the contact element 7 and at least one of the conducting surfaces 9. Moreover, due to lifting of the contact element 7, the sealing effect with respect to the switching surface 6 is additionally eliminated, thereby reducing an internal pressure formed in the pretensioning means, and permitting a particularly fast relative motion between the tool holder 3 and the housing 2, since the pressure force is nearly completely reduced. Interruption of the current flow is detected by the evaluation unit and can be transferred e.g. as switching signal to a control means of the manipulation device. Due to the design of the switching surface with three circular ring segment-like conducting surfaces, the contact element 7 is initially only lifted from a conducting surface 9 during a pivot motion of the tool holder 3, which produces a characteristic switching signal. With a linear relative motion in the direction of the trigger axis, all conducting surfaces 9 lose contact with the contact element 7 at substantially the same time so that a different, also characteristic switching signal is produced. The evaluation unit may be designed to distinguish these different, characteristic switching signals, thereby providing information about the direction to the control means of the manipulation device, which may produce a precise return motion of the manipulation device, opposite to the collision direction.

The switching surface 6 is designed as a printed board with several conducting surfaces 9 (shown in FIG. 2 in more detail). The printed board has a substantially circular ring-shaped contour and has three conducting surfaces 9 on its surface, each being designed as circular ring segments. One conducting path 14 covered by insulation material leads from each conducting surface 9 to a contact location 15 on the lower side of the printed board, where an electric cable connection or a plug connection may be provided (not shown). The outer contour of the switching surface 6 is matched to the housing 2. The central bore 16 is provided for passage of the tool holder 3, while the centering bores 17 are designed for operative connection to positioning pins (not shown in FIG. 2) provided in the housing 2 for positioning the printed board.

The invention claimed is:

1. An overload protection device for a manipulation unit driving a tool, the protection device comprising:
   a housing for mounting to the manipulation unit;
   a tool holder cooperating with the tool;
   a pre-tensioning means for generating a pre-tensioning force between said housing and said tool holder, said pre-tensioning means comprising a piston arrangement having a pressure piston which can be loaded by a medium; and
   a switching unit which operates in response to relative motion between said housing and said tool holder, said switching unit having at least one electrically conducting switching surface and at least one electrically conducting contact element disposed for electrical contact with said switching surface, said switching surface and said contact element disposed on mutually facing surface sections of said tool holder and said housing, wherein said contact element comprises a sealing means which seals said pressure piston relative to said switching surface.

2. The overload protection device of claim 1, wherein said contact element comprises an elastic conducting material or a conducting elastomeric material.

3. The overload protection device of claim 1, wherein said contact element is elastically deformed by said pre-tensioning force and is flatly supported on and in contact with said switching surface.

4. The overload protection device of claim 1, wherein said surface sections having said switching unit provide protection from ambient influences in a switching area defined by said housing and/or said tool holder.

5. The overload protection device of claim 1, wherein said switching device comprises a printed board having several conducting surfaces.

6. The overload protection device of claim 5, wherein said surface sections are aligned substantially orthogonally relative to a trigger axis defined by an operative connection between said housing and said tool holder.

7. The overload protection device of claim 5, wherein each conducting surface is circular ring segment-shaped.

8. The overload protection device of claim 6, wherein each conducting surface has as a segment angle of 120° relative to said trigger axis.

9. The overload protection device of claim 1, wherein said contact element is an annular sealing element.

10. The overload protection device of claim 6, wherein said contact element is disposed coaxially with respect to said trigger axis.

11. The overload protection device of claim 6, wherein said contact element is mounted in a front end groove of said tool holder which extends, at least in sections, about said trigger axis.

12. The overload protection device of claim 5, wherein, in a neutral position of said tool holder, said contact element provides electrical contact between said several conducting surfaces of said printed board for neutral current flow to detect disturbances.

13. The overload protection device of claim 12, further comprising means for monitoring said neutral current flow to detect said disturbances.

14. The overload protection device of claim 1, wherein a switching path of said switching unit s<2 mm is provided in an axial direction of said tool holder relative to said housing and/or a switching angle α<10° is provided for tilting motions of said tool holder relative to said housing.

* * * * *